United States Patent
Hwang et al.

(10) Patent No.: US 7,862,765 B2
(45) Date of Patent: Jan. 4, 2011

(54) METHOD FOR SYNTHESIZING CONDUCTIVE COMPOSITE

(75) Inventors: Ho-Soo Hwang, Gyeonggi-do (KR); Jung-Keun Cho, Seoul (KR)

(73) Assignee: Semes Co., Ltd. (KR)

( * ) Notice: Subject to any disclaimer, the term of this patent is extended or adjusted under 35 U.S.C. 154(b) by 0 days.

(21) Appl. No.: 12/274,631

(22) Filed: Nov. 20, 2008

(65) Prior Publication Data

US 2010/0123274 A1    May 20, 2010

(30) Foreign Application Priority Data

Nov. 18, 2008    (KR) .................. 10-2008-0114353

(51) Int. Cl.
*B29C 67/00* (2006.01)
(52) U.S. Cl. ............... 264/439; 264/435; 264/440; 264/450; 264/453; 264/478; 264/484
(58) Field of Classification Search ............ 264/435, 264/439, 440, 450, 453, 478, 484
See application file for complete search history.

(56) References Cited

U.S. PATENT DOCUMENTS

| | | | |
|---|---|---|---|
| 6,875,394 B2 * | 4/2005 | Soulier | 264/450 |
| 2004/0131841 A1 * | 7/2004 | Koide et al. | 428/323 |
| 2007/0181855 A1 * | 8/2007 | Nagao et al. | 252/500 |
| 2007/0207182 A1 * | 9/2007 | Weber et al. | 424/423 |

* cited by examiner

*Primary Examiner*—Philip C Tucker
*Assistant Examiner*—Alison Hindenlang
(74) *Attorney, Agent, or Firm*—Myers Bigel Sibley & Sajovec, P.A.

(57) ABSTRACT

Provided are an apparatus and method for synthesizing a conductive composite with enhanced electrical conductivity. The apparatus includes: an injection-molding machine which injection-molds pellets created by mixing carbon nanotubes (CNTs) with polymers; and an electric field generator which applies an electric field to the pellets that are melted while the melted pellets are injection-molded and thus rearranges the CNTs included in a composite into which the melted pellets are injection-molded.

5 Claims, 8 Drawing Sheets

METHOD FOR SYNTHESIZING CONDUCTIVE COMPOSITE

CROSS-REFERENCE TO RELATED APPLICATION

This application claims priority from Korean Patent Application No. 10-2008-0114353 filed on Nov. 18, 2008, in the Korean Intellectual Property Office, the disclosure of which is incorporated herein by reference in its entirety.

BACKGROUND OF THE INVENTION

1. Field of the Invention

The present invention relates to an apparatus and method for synthesizing a conductive composite, and more particularly, to an apparatus and method for synthesizing a conductive composite with enhanced electrical conductivity by combining carbon nanotubes (CNTs) with other materials.

2. Description of the Related Art

Carbon nanotubes (CNTs) are composed of carbon atoms, each being combined with three adjacent carbon atoms to form a hexagonal beehive pattern. Due to their superior electrical, thermal, and mechanical properties, CNTs are applied in various industrial fields of field emission devices, electro-chemistry and energy storage, micro-mechatronics system, organic and inorganic composite materials, and the like.

CNTs may be synthesized by laser ablation, arc discharge, chemical vapor deposition (CVD), pyrolysis of hydrocarbon, or the like. Laser ablation is to vaporize a sample, which includes metal mixed with graphite powder at a predetermined ratio, by using a laser beam to synthesize CNTs. The arc discharge technique is to cause an arc discharge by applying voltages to carbon rods with different diameters in order to synthesize CNTs. In CVD, a source gas is injected into a reactor to grow CNTs by using heat or plasma. In addition, pyrolysis of hydrocarbon is to supply liquid or gaseous hydrocarbon and transition metal into a heated reaction tube and dissolve the hydrocarbon to form CNTs in a gaseous environment.

CNTs formed as described above are conductive materials. CNTs may be combined with polymers to produce conductive composites which can be widely used to disperse static electricity, block electromagnetic waves, and the like.

SUMMARY OF THE INVENTION

Aspects of the present invention provide an apparatus and method for synthesizing a composite, the apparatus and method capable of controlling the orientation of carbon nanotubes (CNTs) included in a composite, which is produced after the CNTs and polymers are mixed and injection-molded, and thus synthesizing the composite with reduced surface resistance and enhanced electrical conductivity.

Aspects of the present invention also provide an apparatus and method for synthesizing a composite, the apparatus and method capable of controlling electrical conductivity of each portion of a composite by adjusting the intensity and direction of an electric field for each portion of the composite, applying the electric field having the adjusted intensity and direction to melted pellets, which are disposed at a location corresponding to each portion of the composite, during injection molding, and thus controlling the direction in which CNTs are arranged in each portion of the composite.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an apparatus for synthesizing a conductive composite. The apparatus includes: an injection-molding machine which injection-molds pellets created by mixing CNTs with polymers; and an electric field generator which applies an electric field to the pellets that are melted while the melted pellets are injection-molded and thus rearranges the CNTs included in a composite into which the melted pellets are injection-molded.

A plurality of electrode plates may be installed to correspond to portions of the composite, respectively.

The electric field generator may include: one or more electrode plates which are installed at an outlet of the injection-molding machine and generate vertical electric fields; and a control unit which controls orientation of CNTs by applying current to each of the electrode plates.

The electric field generator may include: a plurality of electrode plates which are installed at the outlet of the injection-molding machine along the shape of the composite and generate electric fields; and a control unit which controls each portion of the composite to have different electrical conductivity by applying a different current to each of the electrode plates.

According to another aspect of the present invention, there is provided a method of synthesizing a conductive composite. The method includes: injecting pellets, which were created by extruding CNTs and polymers, into an injection-molding machine and injection-molding the pellets by using the injection-molding machine; and applying an electric field to the pellets which are being injection-molded by the injection-molding machine and thus rearranging the CNTs included in a composite into which the pellets are injection-molded.

According to another aspect of the present invention, there is provided a method of synthesizing a conductive composite. The method includes: extruding CNTs and polymers by using an extruder and molding pellets; injecting the pellets into an injection-molding machine and injection-molding the pellets by using the injection-molding machine; and applying an electric field to the pellets which are being injection-molded, at an outlet of the injection-molding machine, wherein the direction and intensity of the electric field are adjusted for each portion of a composite, into which the pellets are injection-molded, and the electric field having the adjusted direction and intensity is applied to the pellets disposed at a location corresponding to each portion of the composite so that each portion of the composite has a different surface resistance value and different electrical conductivity.

BRIEF DESCRIPTION OF THE DRAWINGS

The above and other, aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in more detail with reference to the attached drawings.

Carbon nanotubes (CNTs) are conductive materials. CNTs may be combined with polymers to produce conductive composites which can be widely used to disperse static electricity, block electromagnetic waves, and the like. In order to synthesize a conductive composite of CNTs and polymers, the CNTs and the polymers, e.g., polycarbonates (PCs), are uniformly mixed with each other and then injection-molded.

Figure 5:
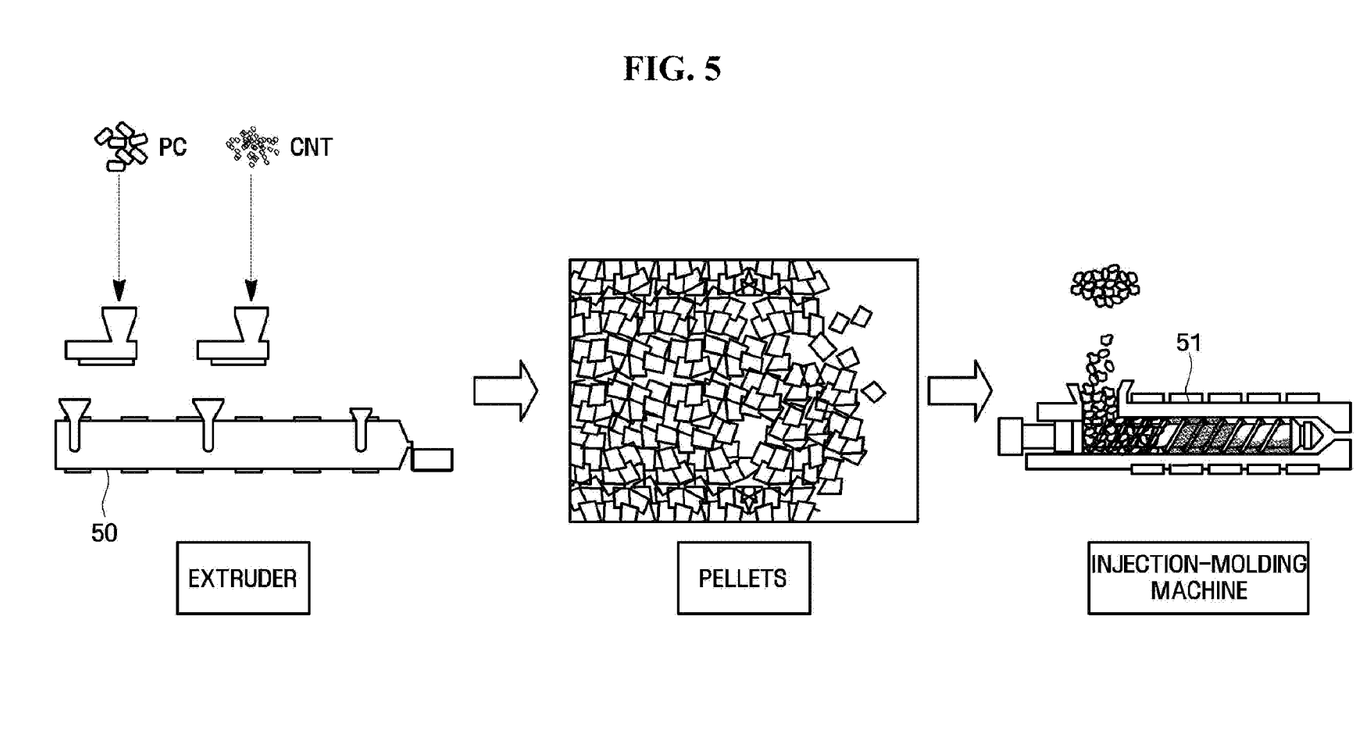
FIG. 5 is a schematic diagram of a conventional apparatus for synthesizing a conductive composite by using an extruder and an injection-molding machine.
Figure 6:
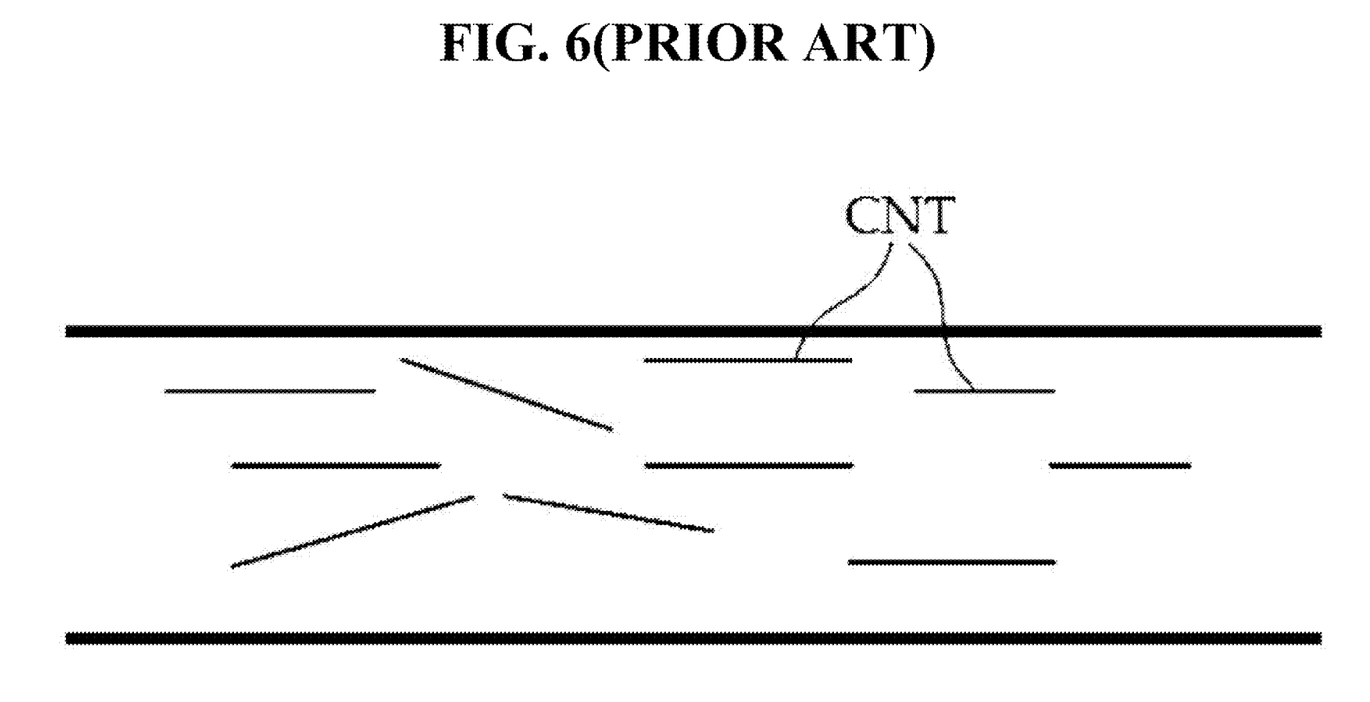
FIG. 6 is a schematic diagram of CNTs arranged in a direction when the CNTs and polymers are injection-molded in FIG. 5.
Figure 7:
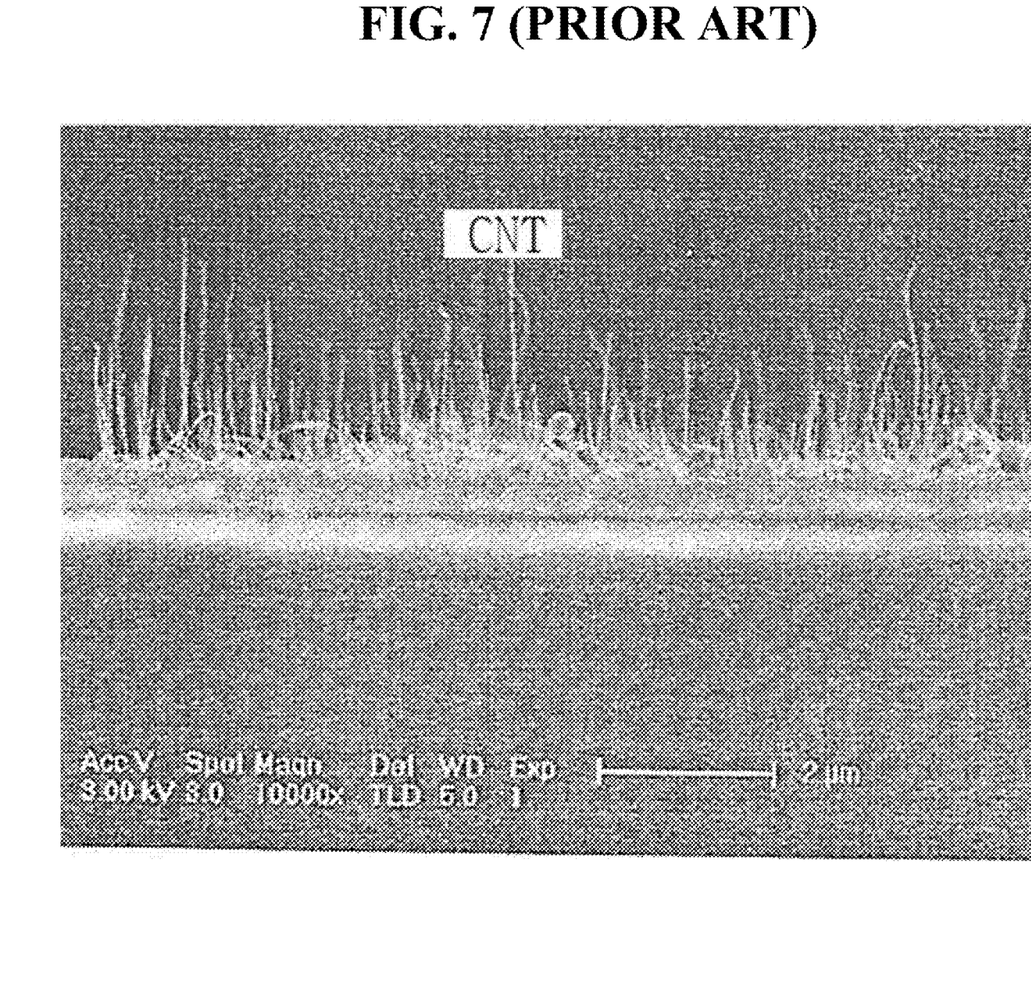
FIG. 7 is a photographed image of the CNTs arranged in a direction after injection molding in FIG. 6, wherein the CNTs are included in a composite of the CNTs and the polymers.

FIG. 5 is a schematic diagram of a conventional apparatus for synthesizing a conductive composite by using an extruder 50 and an injection-molding machine 51. FIG. 6 is a schematic diagram of CNTs arranged in a direction when the CNTs and polymers are injection-molded in FIG. 5. FIG. 7 is a photographed image of the CNTs arranged in a direction after injection molding in FIG. 6, wherein the CNTs are included in a composite of the CNTs and the polymers.

Referring to FIG. 5, CNTs and PCs are extruded and injection-molded. Specifically, while CNTs and PCs are injected at a predetermined ratio into the extruder 50, the extruder 50 uniformly mixes the CNTs with the PCs to extrude them.

After the extruder 50 extrudes the CNTs and the PCs, pellets having a predetermined shape may be created. The created pellets take the form of particles having a predetermined shape. The pellets are injected into the injection-molding machine 51 and thus molded into a product (i.e., a composite) having a predetermined shape.

A composite, into which the PCs and the CNTs are injection-molded, is a conductive composite having superior electrical conductivity. Thus, as described above, the composite can be widely used to disperse static electricity, block electromagnetic waves, and the like. The CNTs included in the pellets, which were created after the extrusion process, are randomly arranged. However, during injection molding, the CNTs may be rearranged in a direction due to injection pressure.

For example, referring to FIGS. 6 and 7. CNTs included in pellets may be injection-molded while being arranged in a direction due to an external environmental factor such as injection pressure. In a composite into which the CNTs and polymers are injection-molded, the CNTs may be arranged in a direction. As the CNTs are arranged in a direction, they lose contact with each other, thereby increasing surface resistance. In addition, the electrical conductivity of the composite of the CNTs and the polymers (e.g., PCs) is reduced. Thus, the effects of the composite as a conductive composite can be reduced.

Figure 1:
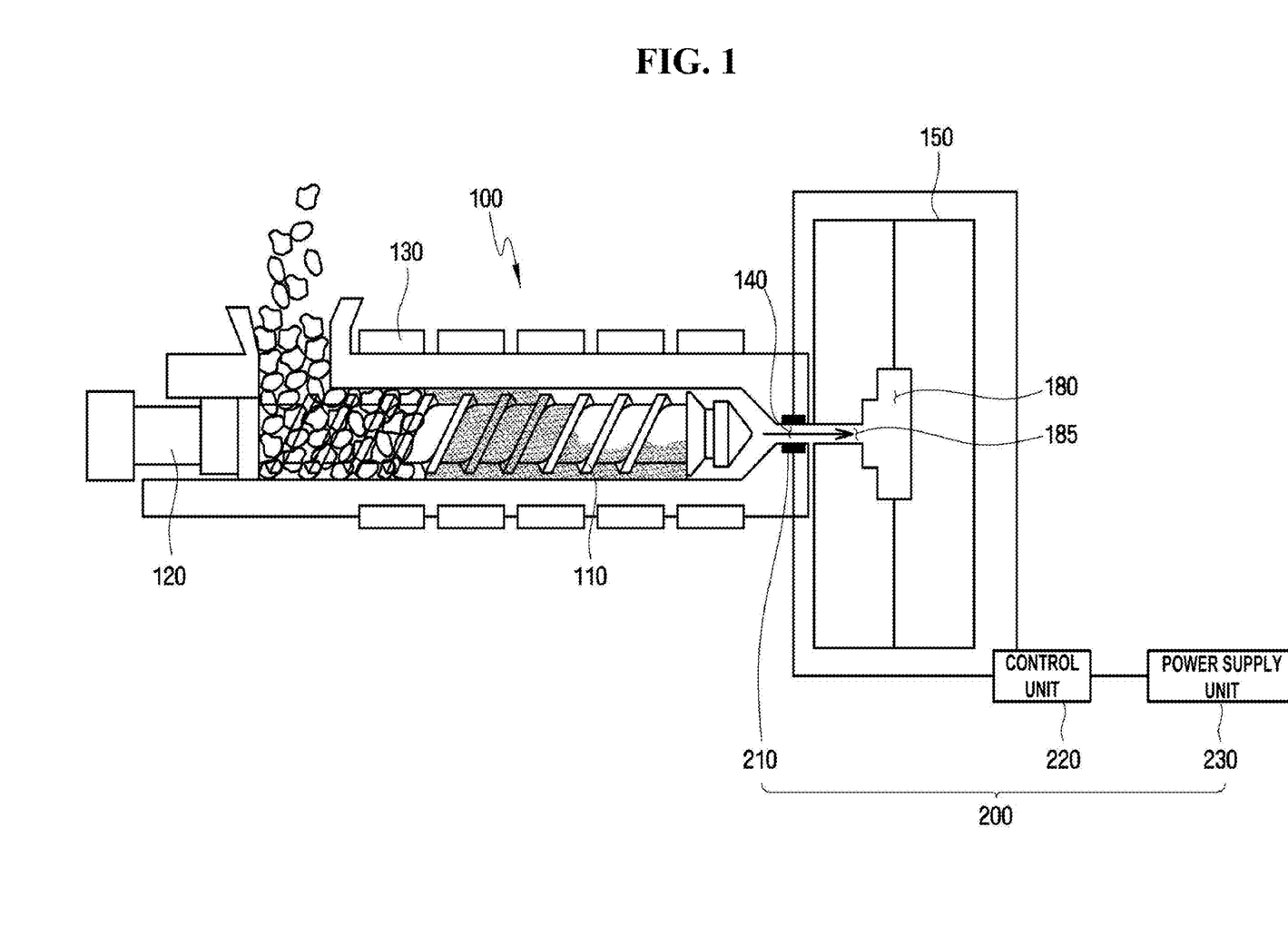
FIG. 1 is a schematic diagram of an apparatus for synthesizing a conductive composite according to an exemplary embodiment of the present invention.

FIG. 1 is a schematic diagram of an apparatus for synthesizing a conductive composite according to an exemplary embodiment of the present invention. Referring to FIG. 1, the apparatus according to the present embodiment may include an injection-molding machine 100 and an electric field generator 200.

The injection-molding machine 100 receives pellets molded by extruding CNTs and polymers and heats and thus melts the pellets by using a heater 130 and a screw 110. The injection-molding machine 100 rotates the screw 110 to feed the melted pellets toward a front end of the screw 110. The injection-molding machine 100 ejects the melted pellets through an outlet 140 by using high pressure generated by a piston 120. Then, the ejected, melted pellets are injected into a mold 150 having a predetermined shape. Accordingly, the injected, melted pellets cool within a cavity 180 formed in the mold 150 and solidify into a CNT-polymer composite having the same shape and size as the cavity 180. Here, the cavity 180 is shaped like a desired product, i.e., a desired composite.

In the present embodiment, the melted pellets may refer to pellets (including CNTs and polymers) which are injected into the screw 110 of the injection-molding machine 100 and then melted or pellets which are injected into the mold 150 and not yet solidified.

The electric field generator 200 applies an electric field to melted pellets while the melted pellets are molded into a composite having a predetermined shape. While the melted pellets solidify, the electric field generator 200 applies an electric field to the melted pellets to rearrange CNTs included in the melted pellets. For example, after pellets, which include CNTs and PCs (i.e., polymers), are melted, if an electric field is applied to the melted pellets while the melted pellets are being injection-molded, the orientation of the CNTs may be changed, that is, the CNTs may be rearranged, due to fluidity and pressure applied during the injection-molding process.

Generally, when CNTs are arranged randomly, they contact each other. Therefore, electrical conductivity is increased while surface resistance is reduced. On the other hand, when CNTs are arranged in a direction, they do not contact each other. Thus, electrical conductivity is reduced while surface resistance is increased.

In this regard, the electric field generator 200 according to the present embodiment may apply an electric field to melted pellets during the injection-molding process in order to rearrange CNTs. Then, the orientation of the CNTs toward a direction may be reduced while the CNTs are induced to have relatively isotropic orientation. Consequently, electrical conductivity can be increased.

The electric field generator 200 may include one or more electrode plates 210, a control unit 220 which controls the orientation of CNTs by applying current or voltage to the electrode plates 210, and a power supply unit 230 which supplies power to the electrode plates 210.

Each of the electrode plates 210 functions as a medium for applying an electric field to melted pellets. The electrode plates 210 may be installed adjacent to the outlet 140 through which melted pellets in the injection-molding machine 100 are ejected into the mold 150, a gate 185 of the mold 150, and the cavity 180 which is shaped like a desired product (i.e., a desired composite). The outlet 140 is an exit through which melted pellets are ejected by the screw 110 of the injection-molding machine 100. The gate 185 functions as an entrance to the mold 150 and a passage through which melted pellets are injected into the mold 150. The cavity 180 is shaped like a product (i.e., a composite) that is to be finally produced. Melted pellets fill the cavity 180 and solidify within the cavity 180.

In order to insulate the electrode plates 210 from surrounding metal materials, each of the electrode plates 210 may be sealed with an insulator. When the electrode plates 210 are installed adjacent to the outlet 140 or the gate 185, an electric field may be applied to melted pellets which are being transferred quickly through the narrow outlet 140 or gate 185. When the electrode plates 210 are installed adjacent to the cavity 180 in the mold 150, a wide electric field may be applied to melted pellets which fill the relatively wide cavity 180.

As described above, one or more electrode plates 210 may be installed according to the direction and intensity, of an electric field that is applied to melted pellets. For example, when the electrode plates 210 are installed adjacent to the outlet 140 or the gate 185, a relatively strong electric field may be applied to melted pellets. When the electrode plates 210 are installed adjacent to the cavity 180 of the mold 150, a relatively weak electric field may be applied to the melted pellets. Each of the electrode plate 210 may be made of a metal material having superior electrical conductivity, such as copper or silver.

The control unit 220 controls the intensity of an electric field that is applied to each of the electrode plates 210. For example, when the electrode plates 210 are installed adjacent to the outlet 140 or the gate 185, the control unit 220 may power up the power supply unit 230 to apply a relatively strong electric field. The control unit 220 may calculate the amount of current (for example, the amount of current which corresponds to force applied during extrusion) which can cause CNTs included in melted pellets to become isotropic (i.e., to be arranged in all directions) and apply an electric field, which corresponds to the calculated amount of current, to the melted pellets. For example, the control unit 220 may calculate pressure or force applied to melted pellets, in which CNTs are arranged in a direction due to injection pressure applied to the melted pellets during injection molding, as the amount of current and apply the calculated amount of current to the melted pellets to rearrange the CNTs.

Figure 2:
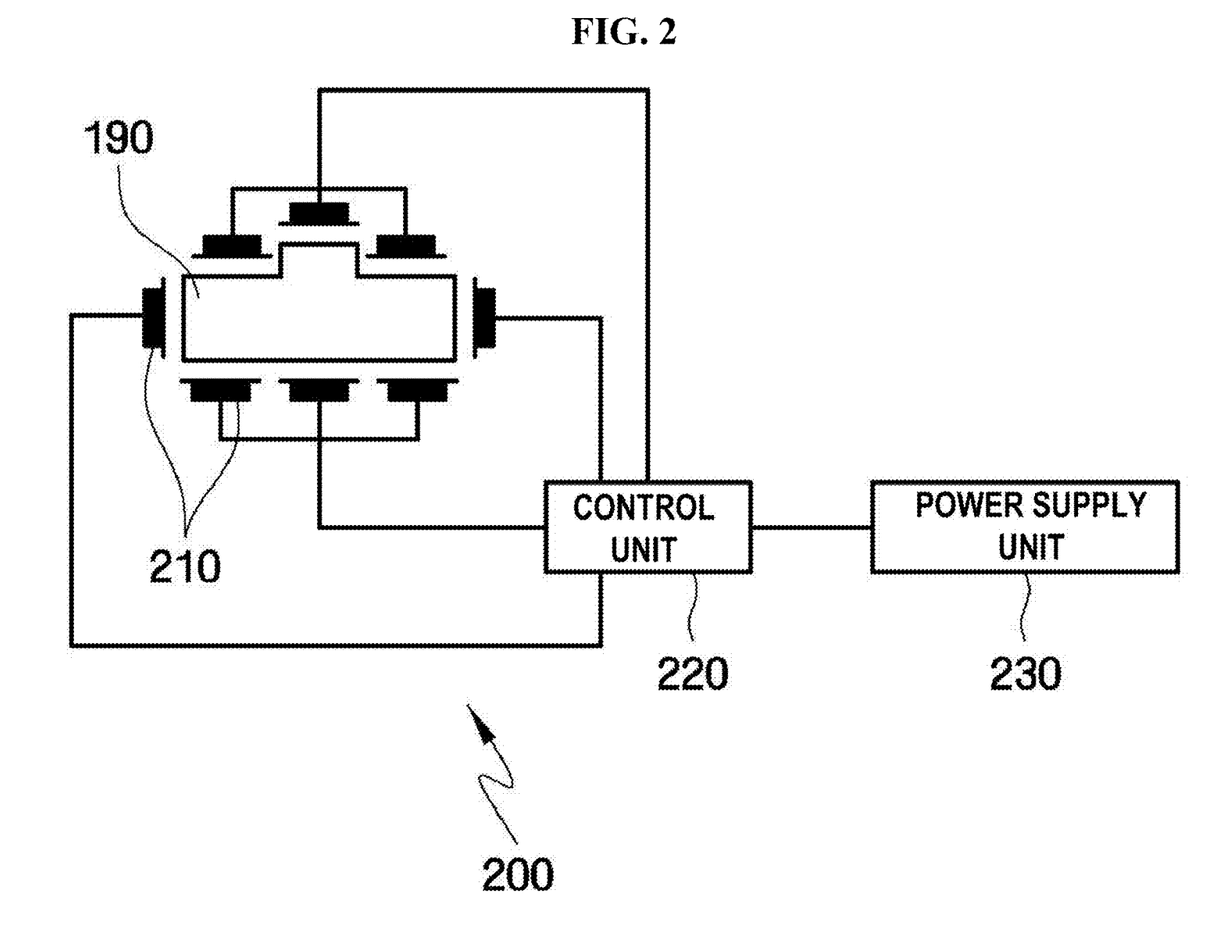
FIG. 2 is a block diagram of an electric field generator which applies electric fields to a plurality of electrode plates included in the apparatus of FIG. 1.

FIG. 2 is a block diagram of the electric field generator 200 which applies electric fields to the electrode plates 210 included in the apparatus of FIG. 1.

Referring to FIG. 2, the cavity 180 of the mold 150 may be filled with melted pellets, and the melted pellets may be molded into a predetermined product (composite). Since a product produced by injection molding can have a complex shape, the orientation of CNTs may vary in each portion of the product according to fluidity and pressure applied to melted pellets, which are disposed at a location corresponding to each portion of the product, during injection molding.

Therefore, the electrode plates 210 may be arranged along the shape of a composite 190, which is produced by injection molding, in the mold 150 in order to control the intensity and direction of an electric field that is applied to the melted pellets disposed at a location corresponding to each portion of the composite 190. That is, electrical conductivity can be controlled for each portion of the composite 190 by applying a different electric field to the melted pellets, which are disposed at a location corresponding to each portion of the composite 190, and thus rearranging CNTs in a direction suitable for each portion of the composite 190.

For example, referring to FIG. 2, the electrode plates 210 may be arranged along the shape of the composite 190 which is produced by injection molding, and the control unit 220 may control the surface resistance and electrical conductivity of each portion of the composite 190 by adjusting the amount of current that is applied to each of the electrode plates 210.

Specifically, when the control unit 220 is to cause the center of an upper surface of the composite 190 to have highest electrical conductivity while reducing the electrical conductivity of other portions of the composite 190 to predetermined levels, it may control the amount of current applied to one of the electrode plates 210 which is installed in the center of the upper surface of the composite 190 and the amount of current applied to the other ones of the electrode plates 210 differently according to a desired surface resistance value for each portion of the composite 190. Here, the surface resistance value (0 hn/sq) is the reciprocal of electrical conductivity (siemens/m). Thus, a reduction in the surface resistance value may result in an increase in electrical conductivity.

When CNTs are arranged in an isotropic manner, they contact each other, thereby reducing surface resistance. Accordingly, the electrical conductivity of the composite 190, which includes the CNTs, can be increased. In the present embodiment, since an electric field is applied to melted pellets during injection molding to rearrange CNTs, isotropic properties of the CNTs are increased. As a result, the composite 190 having reduced surface resistance and enhanced electrical conductivity can be obtained. Therefore, a more superior conductive composite can be manufactured can be obtained.

A screen-printing method, which is used to manufacture field emission displays (FEDs) or liquid crystal display (LCD)-backlight units, is also used to rearrange CNTs by applying an electric field to the CNTs. Therefore, the method of applying an electric field to CNTs and thus rearranging the CNTs will not be described in detail.

Figure 3A:
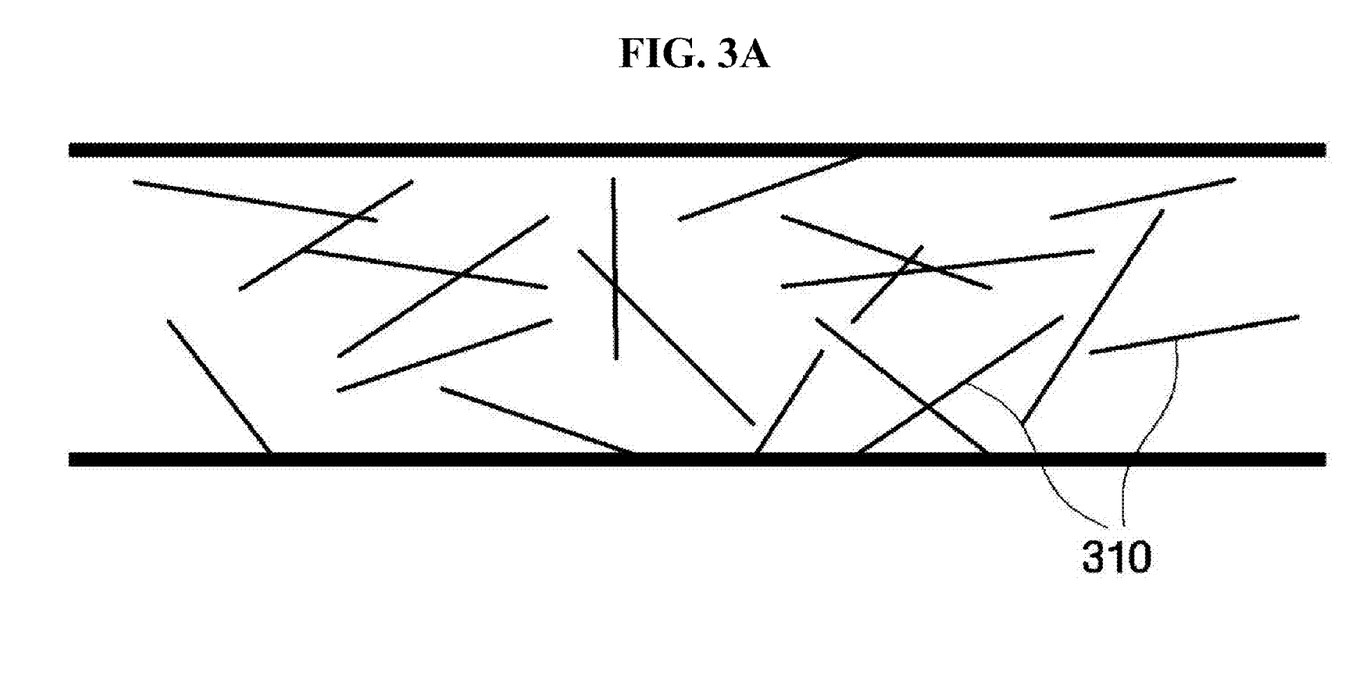
FIG. 3A schematically shows the arrangement of carbon nanotubes (CNTs) molded by the apparatus of FIG. 1.
Figure 3B:
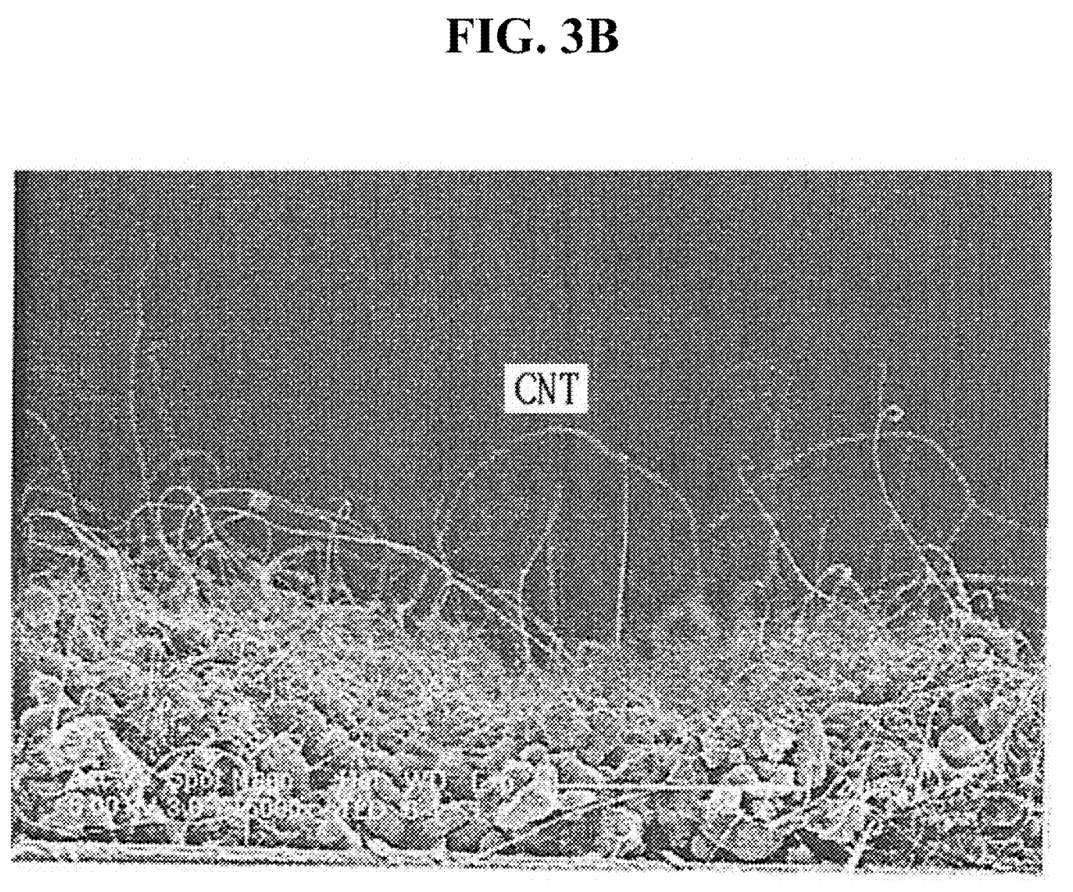
FIG. 3B is a photographed image of the CNTs molded by the apparatus of FIG. 1.

FIG. 3A schematically shows the arrangement of CNTs 310 molded by the apparatus of FIG. 1. FIG. 3B is a photographed image of the CNTs 310 molded by the apparatus of FIG. 1.

Referring to FIG. 3A, the CNTs 310 molded by the apparatus of FIG. 1 may be arranged randomly. While the CNTs injected-molded by the conventional apparatus are arranged in a direction as shown in FIG. 6, the CNTs 310 according to the present embodiment may be arranged randomly since an electric field is applied to melted pellets during injection molding in order to rearrange the CNTs included in the melted pellets.

Referring to FIG. 3B, the CNTs 310 are arranged randomly since an electric field was applied to the CNTs 310. Specifically, the CNTs 310, which are shaped like thin threads, are arranged randomly while remaining in contact with each other.

Figure 4:
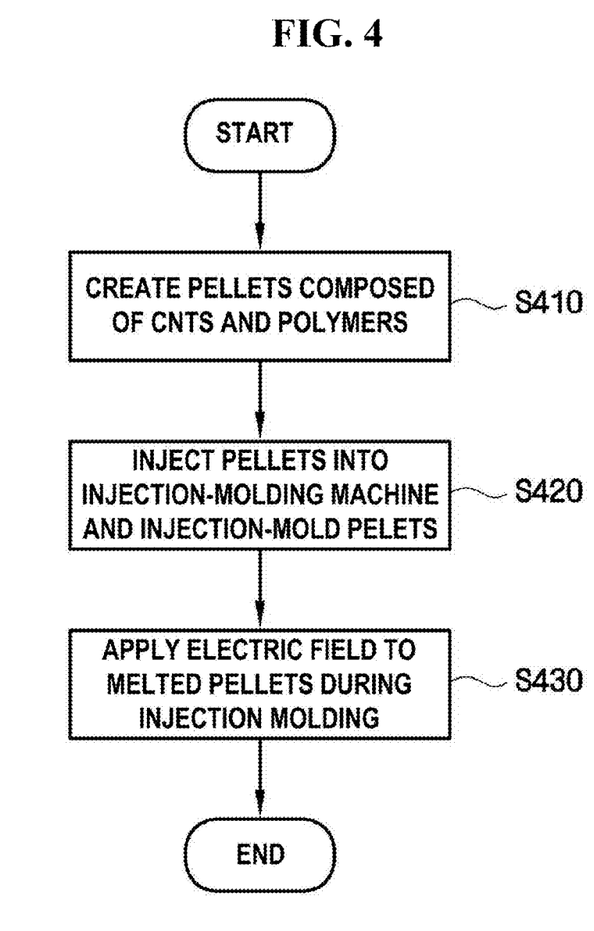
FIG. 4 is a flowchart illustrating a method of synthesizing a conductive composite according to an exemplary embodiment of the present invention.

FIG. 4 is a flowchart illustrating a method of synthesizing a conductive composite according to an exemplary embodiment of the present invention.

Referring to FIG. 4, CNTs and polymers are mixed with each other by using an extruder to create pellets (operation S410). For example, when the polymers are PCs, the CNTs and the PCs are injected into the extruder 50 as shown in FIG. 5. Then, a mixture of the CNTs and the PCs cools as it is extruded into the air through an outlet of the extruder 50. Finally, the mixture of the CNTs and the PCs is cut into predetermined sizes to create the pellets.

The created pellets are injected into the injection-molding machine 100 and thus injection-molded (operation S420). For example, when the pellets which include the CNTs and the PCs (i.e., polymers), are injected into the injection-molding machine 100, the injection-molding machine 100 transfers the pellets into the mold 150 while applying predetermined pressure to the pellets and heating the pellets to a predetermined temperature. Then, the melted pellets in the mold 150 are molded into a product. Here, the product produced by molding the melted pellets may be referred to as a composite of CNTs and polymers.

During injection molding, an electric field is applied to the melted pellets, which are being transferred or solidified, to rearrange the CNTs included in the melted pellets (operation S430). Here, the electric field generator 220 may apply an electric field to the melted pellets through the electrode plates 210 which are installed adjacent to the outlet 140, the gate 185, or the cavity 180 in a path along which the melted pellets are transferred.

When the electric field generator 220 applies an electric field to the melted pellets through the electrode plates 210, the CNTs included in the melted pellets may be rearranged and induced to have isotropic orientation as shown in FIG. 3A.

The control unit 220 controls the amount of current that is applied to each of the electrode plates 210 in order to adjust the intensity and direction of an electric field generated by each of the electrode plates 210. In so doing, the control unit 220 can control the surface resistance and electrical conductivity of each portion of the composite 190 which has a relatively complex shape.

The electrode plates 210 may correspond to the portions of the composite 190, respectively, and an electric field may be applied to the melted pellets, which are being injection-molded, through each of the electrode plates 210 to control the electrical conductivity and surface resistance of the composite 190.

As described above, according to an embodiment of the present invention, an electric field is applied to melted pellets, which include CNTs and polymers, while the melted pellets are injection-molded. Therefore, the electrical conductivity of a composite, into which the melted pellets are injection-molded, can be enhanced. In addition, the electrical conductivity and surface resistance of each portion of the composite can be controlled to adjust the effects of the composite as a conductive composite, such as the blocking of electromagnetic waves and the dispersion of static electricity.

According to an embodiment of the present invention, when melted pellets, which include CNTs and polymers, are ejected from an injection-molding machine, an electric field having a predetermined direction is applied to the melted pellets to rearrange the CNTs in all directions, thereby enhancing the electrical conductivity of a composite into which the melted pellets are injection-molded.

Since the CNTs are rearranged to contact each other by applying the electric field having the predetermined direction to the melted pellets, the surface resistance of the composite can be reduced.

In addition, the electrical conductivity of each portion of the composite can be controlled by adjusting the direction and/or intensity of an electric field for each portion of the composite, applying the electric field having the adjusted direction and/or intensity to melted pellets, which are disposed at a location corresponding to each portion of the composite, and thus controlling the direction in which the CNTs are arranged in each portion of the composite.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method of synthesizing a conductive composite, the method comprising:
    injecting pellets, which were created by extruding carbon nanotubes CNTs and polymers, into an injection-molding machine and injection-molding the pellets by using the injection-molding machine; and
    applying an electric field to the pellets which are being injection-molded by the injection-molding machine so as to induce the CNTs in a composite into which the pellets are injection-molded to have an isotropic orientation.

2. The method of claim 1, wherein applying an electric field comprises calculating force applied to the melted pellets by the injection-molding machine and using current corresponding to the calculated force to generate the electric field.

3. The method of claim 1, wherein the causing of the CNTs to have an isotropic orientation comprises:
    vertically or horizontally installing one or more electrode plates at an outlet of the injection-molding machine; and generating the electric field by applying current to each of the electrode plates.

4. The method of claim 1, further comprising applying different electric fields to portions of the composite via respective electrode plates installed to correspond to the portions of the composite.

5. A method of synthesizing a conductive composite, the method comprising:

extruding carbon nanotubes CNTs and polymers by using an extruder and molding pellets;

injecting the pellets into an injection-molding machine and injection-molding the pellets by using the injection-molding machine; and applying an electric field to the melted pellets, which are being injection-molded, at an outlet of the injection-molding machine so as to induce the CNTs to have an isotropic orientation, wherein the direction and intensity of the electric field are adjusted for each portion of a composite, into which the pellets are injection-molded, and the electric field having the adjusted direction and intensity is applied to the melted pellets disposed at a location corresponding to each portion of the composite so that each portion of the composite has a different surface resistance value and different electrical conductivity.

* * * * *